G. W. BOWEN.
MEASURING RULE.
APPLICATION FILED MAR. 31, 1919.
1,418,358.
Patented June 6, 1922.
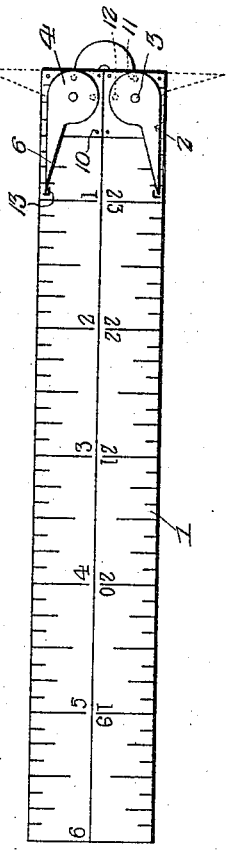
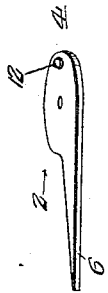
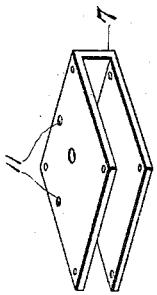
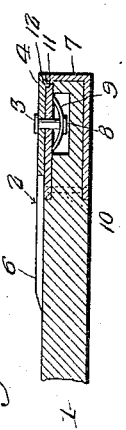
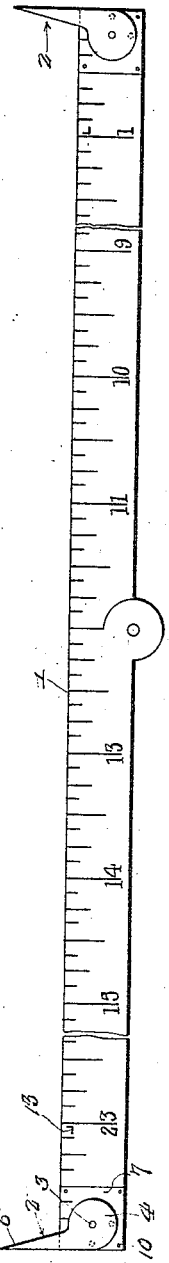
Witnesses
J. H. Crawford
Inventor
G. W. Bowen,
By Victor J. Evans
Attorney

UNITED STATES PATENT OFFICE.

GEORGE W. BOWEN, OF BRIDGETON, NEW JERSEY.

MEASURING RULE.

1,418,358. Specification of Letters Patent. Patented June 6, 1922.

Application filed March 31, 1919. Serial No. 286,271.

*To all whom it may concern:*

Be it known that I, GEORGE W. BOWEN, a citizen of the United States, residing at Bridgeton, in the county of Cumberland and State of New Jersey, have invented new and useful Improvements in Measuring Rules, of which the following is a specification.

My invention relates to rules such as measuring rules ordinarily used by carpenters, mechanics and others for making various measurements for various purposes.

The object of my invention is to provide in conjunction with a measuring rule, a plurality of scribers arranged one at each extremity of the rule, said scribers being arranged so that one of them may be used for centering one end of the rule while the other one is used for scribing or marking the work preparatory to shifting the rule during the operation of measuring off the required distance or distances.

A further object of the invention is to provide a rule with scribers mounted thereon in such manner that the marking fingers of the scribers may be moved to arcs of ninety degree so as to be positioned within the confines or margins of the ends of the rule or perpendicularly with respect to the length of the rule as clearly shown in the drawing. This enables the rule to be carried safely and comfortably in the pocket without danger of the scribers injuring the clothing or hands of the owner of the article.

With the above and other objects in view the invention consists in the novel construction, combination and arrangement herein fully described, illustrated and claimed.

In the accompanying drawing:—

Figure 1 is a plan view of the rule folded and showing the scribers in their folded positions in full line and in their extended position in dotted line.

Figure 2 is a plan view of the rule fully extended with the scribing fingers in their working position.

Figure 3 is an enlarged fragmentary section showing the manner of mounting each scriber in relation to the rule.

Figure 4 is a detail perspective view of one of the springs for holding the pivot of the respective scriber.

Figure 5 is a bottom perspective view of one of the scribers.

Figure 6 is a detail perspective view of the rule tip.

Referring to the drawing 1 designates an ordinary measuring rule which is shown of the two foot length type, the same as now commonly employed by carpenters, mechanics and the like.

In carrying out the present invention, I use in conjunction with the opposite extremity of the rule when in its extended position as shown in Figure 2, scribers 2. Each scriber is connected to the adjacent end of the rule by means of a pivot 3 and comprises a substantially dish shaped hub portion 4 and a tapering and pointed scribing finger 5 terminating in a sharp point 6 adapted to be inserted in the work for a purpose which will hereinafter appear.

The preferred means for attaching each of the scribers 2 to a rule consists of a U-shaped metal tip 7 one of which is shown in Figure 6 of the drawing, said tip being set into the respective end of the rule as shown in Figure 3, the pivot 3 passing through the hub portion of the scribe and through one side of the metal tip 7. The pivot 3 is provided at its inner end with a head or shoulder 8 against which bears a central portion of an arcuate spring 9, the extremities of said spring bearing against the inner side of that wall of the tip 7 through which the pivot 3 passes. This produces a tension on the pivot 8 and holds the scribe 2 frictionally against the outer surface of the tip 7, to provide a spring pivot means.

Each tip 7 is fixedly secured to the adjacent end of the rule by means of rivets or other suitable fasteners 10 and is provided in one face thereof with a pair of sockets or depressions 11 adapted to receive a projection or stud 12 on the inner face of the scriber 2. The sockets or depressions 11 are located so as to receive and hold the stud or projection 12, when the respective scriber is at the full opposite limit of its movement as illustrated in Figure 1. When the scribers are in their folded position as shown by full lines in Figure 1, the pointed extremities thereof lie closely against the face of the rule as shown in Figure 3. If desired, guards 13 of L-shape may be provided as shown in Figure 1, said guards projecting slightly but sufficiently to protect the pointed extremities of the scribers.

With the scribers projecting as shown in

Figue 2, either one of said scribers may be inserted in the work allowing the other scriber to be swept in the arc of a circle the radius of which is equal to the full length of the rule. The centering scriber is then moved to the mark made by the sweeping scriber and the measurement repeated, as many times as may be necessary to measure off the desired length. When the last measurement is less than the entire length of the rule, the added dimension may be figured out on the rule by placing the desired graduation of the rule in line with the last mark and then repeating the operation just hereinabove described, the final mark made by the sweeping scriber determining the ultimate length to be measured off. By means of the construction described quicker and better means are provided for measuring off any determined length. The device is useful for measuring on metal as well as wood and other surfaces. To prevent defacing fine work, instead of making a mark, the scriber may be simply pressed into the material so as to make a depression of slight depth. The device eliminates the necessity of using pencils, chalk and other unreliable markers, effects a saving of time and is simple in construction and operation.

What is claimed is:—

1. The combination with a measuring rule, of a metal tip embracing one end of the rule, a scriber pivotally connected to said tip, spring means associated with the pivot pin for frictionally holding the scriber against the tip and means for holding said scriber in extended and folded position.

2. In combination with a measuring rule, a U-shaped metal tip embracing one end of the rule, said end having a recess therein located under one limb of the tip, a scriber, a pivot pin connecting the same with the tip, the end of the pin extending into the recess, a spring located in the recess and engaging the pivot pin and means for holding said scriber in extended and folded positions.

In testimony whereof I affix my signature.

GEORGE W. BOWEN.